United States Patent [19]

Tashiro et al.

[11] 4,041,324

[45] Aug. 9, 1977

[54] MAGNETIC SHIELD SYSTEM FOR ELECTRIC CARS

[75] Inventors: Korefumi Tashiro, Hitachi; Kosuke Ishikawa, Fukuoka, both of Japan

[73] Assignee: Hitachi, Ltd., Japan

[21] Appl. No.: 652,784

[22] Filed: Jan. 27, 1976

[30] Foreign Application Priority Data

| Jan. 31, 1975 | Japan | 50-13695 |
| July 31, 1975 | Japan | 50-93900 |
| July 31, 1975 | Japan | 50-93904 |
| July 31, 1975 | Japan | 50-93908 |

[51] Int. Cl.² .......................................... H04B 15/00
[52] U.S. Cl. .......................................... 307/91; 307/9; 174/35 R

[58] Field of Search ............... 307/89, 90, 91, 101, 307/9; 174/32, 33, 34, 35 R, 35 C, 35 SM, 35 GC, 35 CE, 35 M, 35 S, 35 TS, 36, 37; 105/61; 340/382, 297, 47; 179/82

[56] References Cited

U.S. PATENT DOCUMENTS

| 3,204,201 | 8/1965 | Bahrs | 307/91 X |
| 3,588,372 | 6/1971 | Jauquet | 179/82 |
| 3,609,208 | 9/1971 | Winpisinger | 307/89 |

*Primary Examiner*—Robert K. Schaefer
*Assistant Examiner*—Morris Ginsburg
*Attorney, Agent, or Firm*—Craig & Antonelli

[57] ABSTRACT

In an electric car comprising a car body and a plurality of electric devices separately arranged on the undercarriage according to their functions, a magnetic shield system in which the plurality of electric devices are electrically connected through wires adjacent ones of which conduct substantially the same magnitude of current flowing in opposite directions.

7 Claims, 34 Drawing Figures

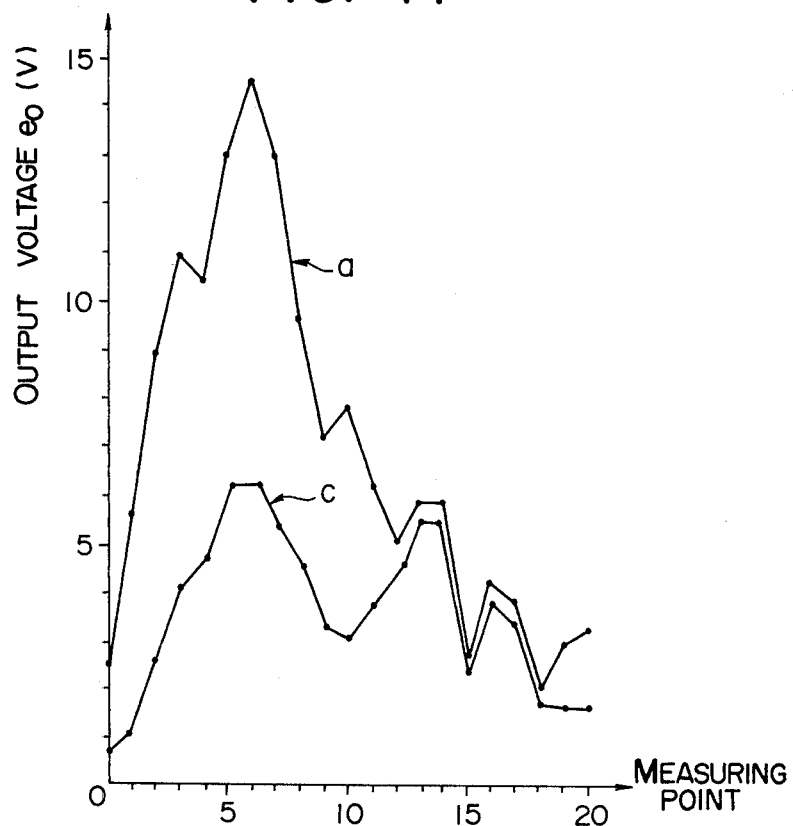
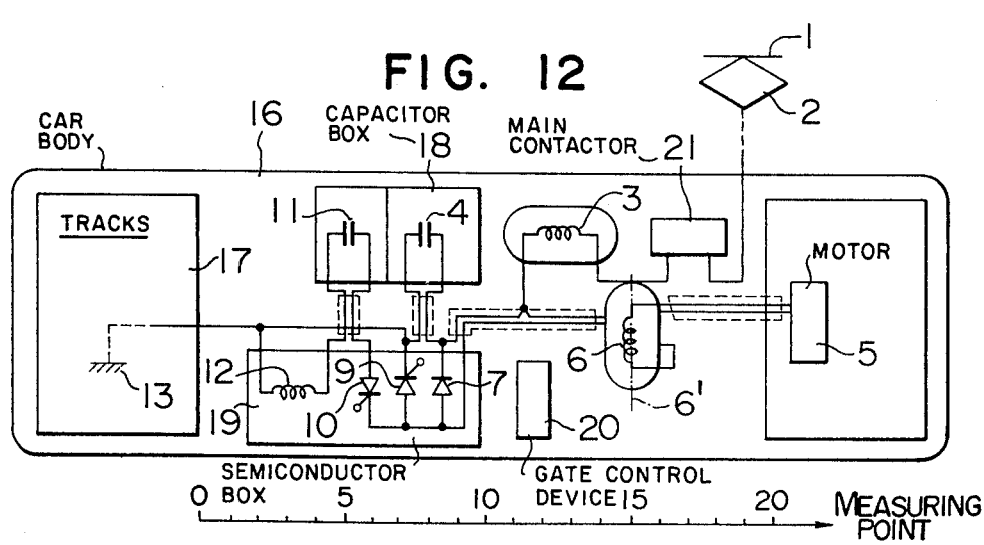

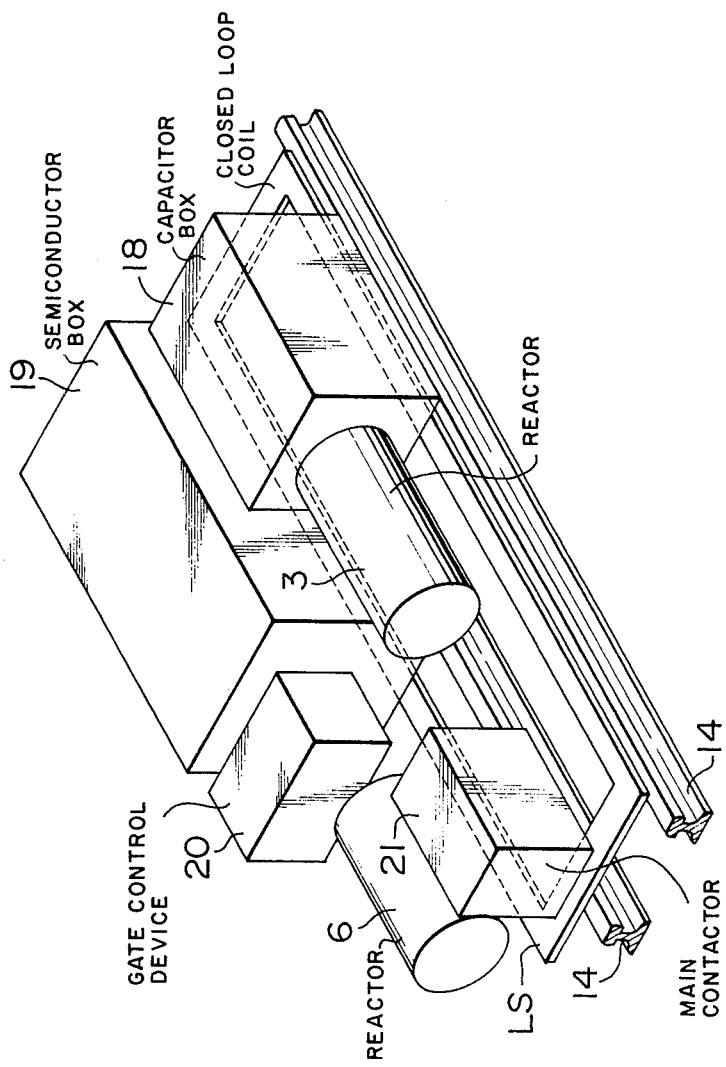

MAGNETIC SHIELD SYSTEM FOR ELECTRIC CARS

BACKGROUND OF THE INVENTION

1. Field of the Invention

This invention relates to a magnetic shield system for electric cars or more in particular to a magnetic shield system for electric cars such that signal devices located along tracks are prevented from being erroneously operated by the magnetic fluxes produced from the electric car toward the track.

2. Description of the Prior Art

An electric car has a plurality of electrical devices in some form or other mounted on it. Such devices for a DC electric car include, for example, a DC motor for driving the car, a thyristor chopper for controlling the DC motor and a thyristor inverter or a commutatorless motor-generator as an auxiliary power supply device. An AC electric car, on the other hand, carries such electrical devices as an AC motor for driving the car and a phase control device for controlling the AC motor. These electric devices are connected by means of a plurality of electric wires for forming an electric circuit.

An electric car runs along a predetermined track, where provision is made for signal devices for transmitting and receiving vehicle information. These signal devices include, for example, a transmitter for transmitting predetermined signals to the rails of the track and a receiver located in spaced relation with the transmitter along the track for receiving the signals transmitted to the rails. When a car enters the track section between the transmitter and the receiver, the rails are short-circuited by the wheels of the car, cutting off the signals so far received by the receiver thereby to indicate the presence of the car in the particular track section.

When current is made to flow in the electric devices mounted on the car, on the other hand, magnetic fluxes are produced from the electric wires making up the electric paths and the electric devices themselves. If these magnetic fluxes have a direct effect on the signal devices, especially on the receiver, there is a danger of the receiver making a mistake by erroneously judging that a vehicle is absent between the transmitter and the receiver in spite of the short-circuited condition of the rails caused by the wheels of the car that have entered the track section between the transmitter and the receiver.

This kind of danger is not limited to the rails functioning as a signal transmission path. A signal device comprising a signal line along the track, which is in sliding contact with the pantagraph of the car to obtain the same relation as that between the rails and the wheels in the preceding case, is likewise exposed to a similar danger.

SUMMARY OF THE INVENTION

An object of the present invention is to provide a magnetic shield system for electric cars for reducing the efect that the magnetic fluxes produced from the car has on the signal devices located along the track.

An advantage of the magnetic shield system for electric cars according to the present invention, which is used with a car comprising a car body and a plurality of electric devices arranged separately on their undercarriage according to their functions, lies in the fact that the plurality of electric devices are electrically connected through wires adjacent ones of which conduct substantially the same magnitude of currents flowing in opposite directions.

The above and other objects, features and advantages will be made apparent by the detailed description taken in conjunction with the accompanying drawings.

BRIEF DESCRIPTION OF THE DRAWING

FIGS. 10, 12, 16, 17, 18, 19, 22, 24, 26, 28 and 29 are diagrams showing other embodiments of the magnetic shield system for electric cars according to the invention.

FIGS. 11, 14, 21, 23, 25, 27 and 30 are graphs showing the effect on the receiver in the respective embodiments mentioned above.

FIG. 31 is a diagram showing an example of a closed loop coil taking place of the shield plate.

DESCRIPTION OF THE PREFERRED EMBODIMENTS

The present invention may be applied to any electric cars on which a plurality of electric cars on which a plurality of electric devices in some form or other are mounted. By way of explanation, however, a DC electric car is taken as an example.

Figure 1:
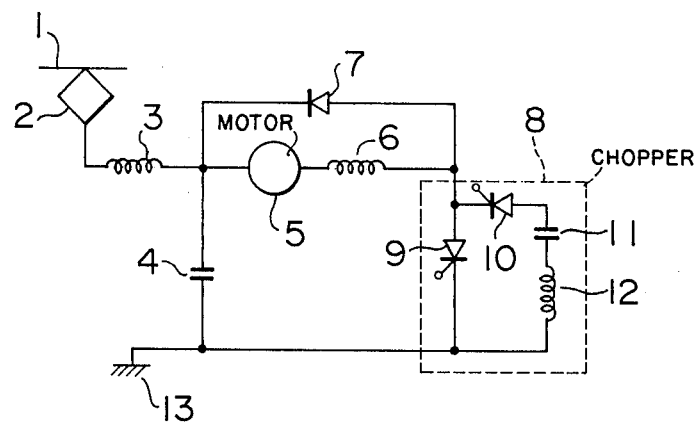
FIG. 1 is a diagram showing an example of the main circuit for the DC electric car.

An example of the main circuit for the DC electric car is shown in the diagram of FIG. 1

In the diagram, reference numeral 1 shows a trolley wire, numeral 2 a pantagraph, numeral 3 a filter reactor, numeral 4 a filter capacitor, numeral 5 a main motor, numeral 6 a main smoothing reactor, numeral 7 a flywheel diode, numeral 8 a chopper. Numerals 9 to 12 show component elements of the chopper 8, of which numeral 9 shows a main thyristor, numeral 10 an auxiliary thyristor, numeral 11 a commutation capacitor, and numeral 12 a commutation reactor. Numeral 13 shows the earth, namely, rails. The operation of this main circuit is not directly related to the present invention and will not be explained.

A commutation current flows through the main thyristor 9, the commutation reactor 12, the commutation capacitor 11 and the auxiliary thyristor 10 during the commutation of the chopper 8 in the main circuit. This commutation current has a period of about 150 μs and is so sharp and large that its peak value reaches a value as high as about 3000 A. While the chopper 8 remains cut off, a forward current flows in the flywheel diode 7. When the chopper 8 is turned on, the flywheel diode 7 is impressed with a reverse voltage thereby to recover the flywheel diode 7. The current which flows at the time of recovery reaches the value of about 2000 A in several microseconds. Due to the on-off operation of the chopper 8, a rectangular-wave current flows in the filter capacitor 4, which current contains much high harmonics. Also, a pulsating current flows in the main smoothing reactor 6.

The plurality of electric devices making up the main circuit, when mounted on the car, are separately arranged suitably taking into consideration their respective functions, the ease of outfitting, the cooling of semiconductor elements including the thyristors and the maintenance of the electric devices.

Figure 2:
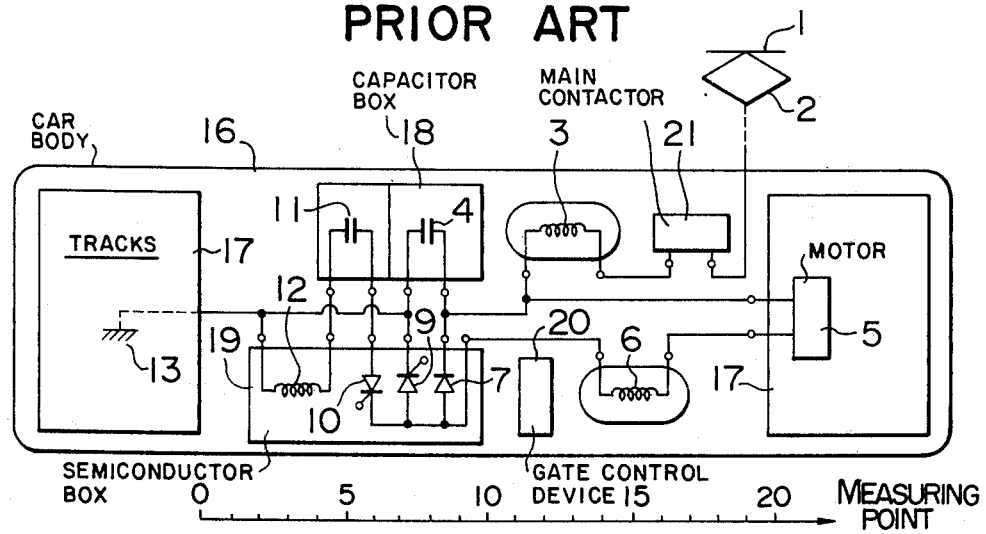
FIG. 2 is a diagram showing a conventional example of the main circuit of FIG. 1 as mounted on the car.

An example of a conventional main circuit mounted on the car is shown in FIG. 2. This drawing is a perspective presentation, as viewed from above the car floor, of the electrical devices arranged on the underside of the car floor and the manner in which they are wired.

In FIG. 2, numerals 1 to 13 show the same component parts as those shown in FIG. 1 by like numerals. Reference numeral 16 shows a car body, numeral 17 tracks, numeral 18 a capacitor box, numeral 19 a semiconductor box, numeral 20 a gate control device for controlling the thyristors 9 and 10, and numeral 21 a main contactor. The flywheel diode 7, the main thyristor 9 and the auxiliary thyristor 10 are housed in the semiconductor box 19 to keep them cool, while the filter capacitor 4 and the commutation capacitor 11 are contained in the capacitor box 18. The filter reactor 3 and the main smoothing reactor 6 are mounted in spaced relation with the other devices again to keep them cool.

As is obvious from FIG. 2 showing the manner in which the devices are mounted on the car, a limited space about 10m in length between the tracks must accommodate a variety of circuits including the commutation circuit in which a sharp and large current flows, the flywheel circuit, the filter circuit in which a pulsating current flows, and electric wires for connecting the electric devices. Also, these electric devices and wires are mounted at a lever only 1m high from the ground. As a result, the magnetic fluxes produced from the electric devices and wires easily reach the ground where the signal devices are located.

Explanation will be made below of an example of the signal device.

Figure 3:
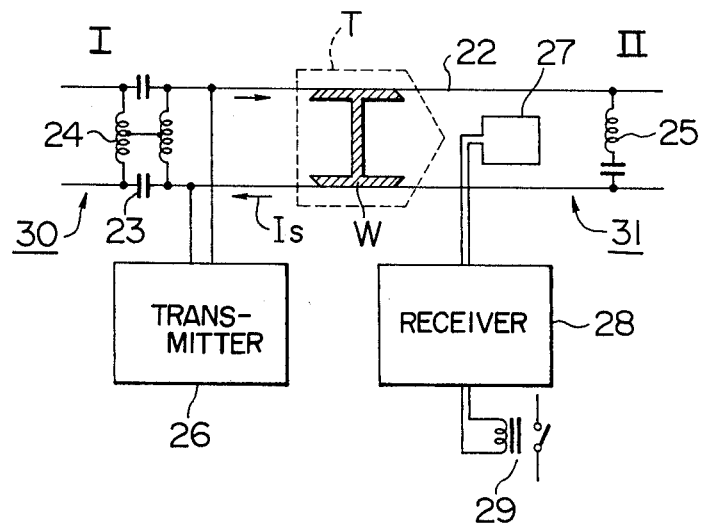
FIG. 3 shows an example of the signal device.

An example of the signal device disposed on the track is shown in FIG. 3.

In this drawing, reference character T shows a car, character W a wheel, reference numeral 22 rails, and numeral 23 an isolating part for separating the track into a plurality of closed sections and isolating each closed section of the rails 22 from the other closed sections. Reference numeral 24 shows an impedance, numeral 25 a short-circuiting impedance. Numerals 26 to 29 show component parts making up the signal device, of which numeral 26 shows a transmitter, numeral 27 a loop coil, numeral 28 a receiver, and numeral 29 a relay. Symbol Is shows a signal current. Numeral 30 shows a closed section I and numeral 31 a closed section II.

Even though the state of car T present in the closed section II is shown in FIG. 3, explanation will be made below of how the signal device operates when the car T is located in the closed section I. The transmitter 26 supplies a predetermined signal current Is to the rails 22. Since the rails 22 of the closed section II are not short-circuited by the wheel W of the car T, the signal current Is is transmitted to the position of the short-circuiting impedance 25. The signal current Is is then magnetically picked up by the loop coil 27 and applied to the receiver 28. The receiver 28, in response to the signal current Is applied thereto, excites the relay 29. As long as the relay 29 is excited, it is judged that no car is present in the closed section II or exactly between the transmitter 26 and the receiver 28. The manner in which the signal device operates when the car T enters the closed section II will next be explained. When the car T enters the closed section II as shown, the wheel W short-circuits the rails 22, so that the signal current Is transmitted from the transmitter 26 is unable to reach the position where the loop coil 27 is located. As the loop coil 27 fails to pick up the signal current Is, the receiver 28 de-energizes the relay 29. As long as the relay 29 is in a de-energized state, a judgement is made that a car is present in the closed section II.

The above-described construction is concerned with an example of the signal device. Such an example is available in two types of coupling system between the transmitter and the receiver, non-modulation type and modulation type.

The non-modulation type is such that the signal current Is of predetermined frequency is transmitted from the transmitter 26 and filtered, detected and converted into a DC voltage by the receiver 28.

In the modulation type, on the other hand, the signal current Is comprising a carrier as modulated by a code wave of different frequencies is transmitted by the transmitter 26. The carrier frequency and the code wave frequency are filtered in that order separately, detected and converted into a DC voltage by the receiver 28.

In either type, the receiver 28 operates by mistake if the frequency component of the magnetic fluxes produced from the car contains a frequency close to the frequency of the signal current Is.

In order to measure the degree of the effect that the magnetic fluxes produced from the car have on the signal device, the inventors have developed and conducted a test on a model of the signal device of non-modulation type.

Figure 4:
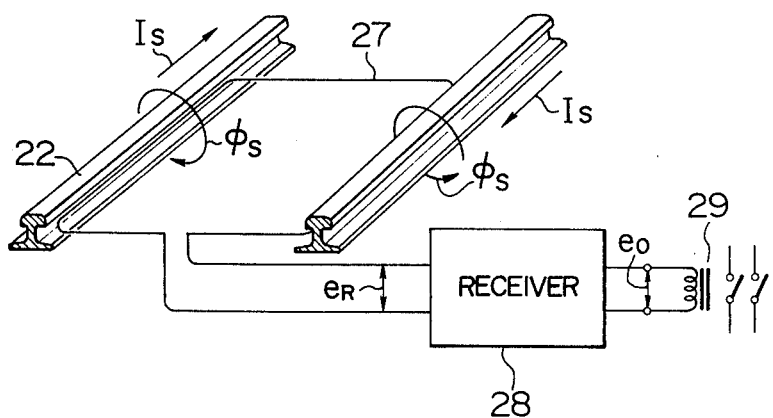
FIG. 4 is a diagram showing an example of a pick-up simulating a receiver for measuring the effect of the magnetic fluxes on the receiver of the signal device.

The diagram of FIG. 4 shows an example of the pick-up of the model of the signal device developed by the inventors. In the drawing, reference numerals 22, 27, 28, 29 and character Is denote component elements equivalent to those denoted by like numerals and character in FIG. 3. Symbol $\phi_s$ shows magnetic fluxes produced by the flow of the signal current Is, symbol $e_R$ a voltage received by the receiver 28 from the loop coil 27, and symbol $e_O$ an output voltage of the receiver 28. This output voltage is a DC voltage which is drawn out of the received signal $e_R$ through a detector circuit and a band-pass filter corresponding to the signal current frequencies. This pick-up operation will be understood from the foregoing description of the signal device shown in FIG. 3, and is such that the relay 29 is energized only when the signal current Is of a predetermined frequency flows.

As already described, in the event that the magnetic fluxes produced from the car contain a frequency component close to the frequency of the of signal current Is, an output voltage $e_O$ is produced from the receiver 28 even in the absence of the actual signal current Is. When this voltage $e_o$ reaches a level high enough to excite the relay 29, the relay 29 is energized. The result is an erroneous actuation of the signal device. This pick-up simulating the non-modulation type of signal device can produce a DC voltage $e_O$ corresponding to a frequency component of the magnetic fluxes produced from the car which is close to the frequency of the signal current, and therefore it is suitably used for measurement. This is because the effect on the non-modulation type of signal device may be determined by the magnitude of the DC voltage $e_O$, and the effect on the modulation type of signal device to some extent by the distribution of the intensity of the DC voltage $e_O$. In other words, in an appropriate combination of the DC voltage $e_O$ and the car speed, the intensity variation of DC voltage $e_O$ with the movement of the car approaches the code wave frequency used in the signal device of modulation type, resulting in the particular signal device being actuated by mistake.

Figure 5:
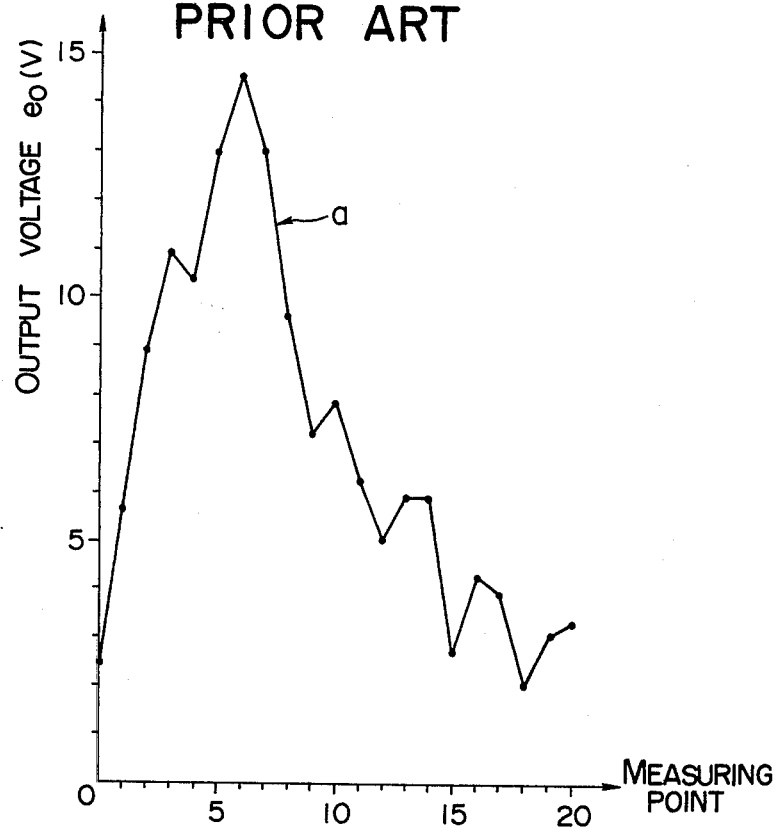
FIG. 5 is a graphic presentation of the result of the measurement of the effect of the conventional car on the receiver.

The graph of FIG. 5 shows the result of measurement of the effect that the conventional car of FIG. 2 has on the receiver. In this graph, the abscissa represents the measuring points corresponding to those shown in the lower part of FIG. 2, and the ordinate represents the output voltage $e_O$ of the receiver 28. The polygonal line $a$ illustrates the result of the measurement. The measurement was conducted at the stringing voltage of 1500 V, the stringing current of 400 A, the operating frequency 330 Hz of the chopper 8, the duty cycle of 50% of the chopper 8 and the height of 0.9m from the ground to the underside of the car floor.

It is seen from FIG. 5 that the maximum value of the output voltage $e_O$ (hereinafter referred to merely as the "noise") produced by the receiver 28 due to the magnetic fluxes produced from the car is of the order of 15 V.

If the relay 29 is not to be erroneously operated by the noise, it is necessary to have a signal current Is whereby the output voltage $e_o$ 15 y or higher is produced, so that the relay 29 is excited only in response to that signal current Is. This consideration must be given to all the signal devices which may otherwise be subject to the effect of the noise. On the other hand, it is not advisable to increase the magnitude of electricity handled by the signal devices in view of the their capacity and economic factors including power consumption.

For the reasons mentioned above, the noise itself, namely, the magnetic fluxes produced from the car are required to be reduced.

Figure 6:
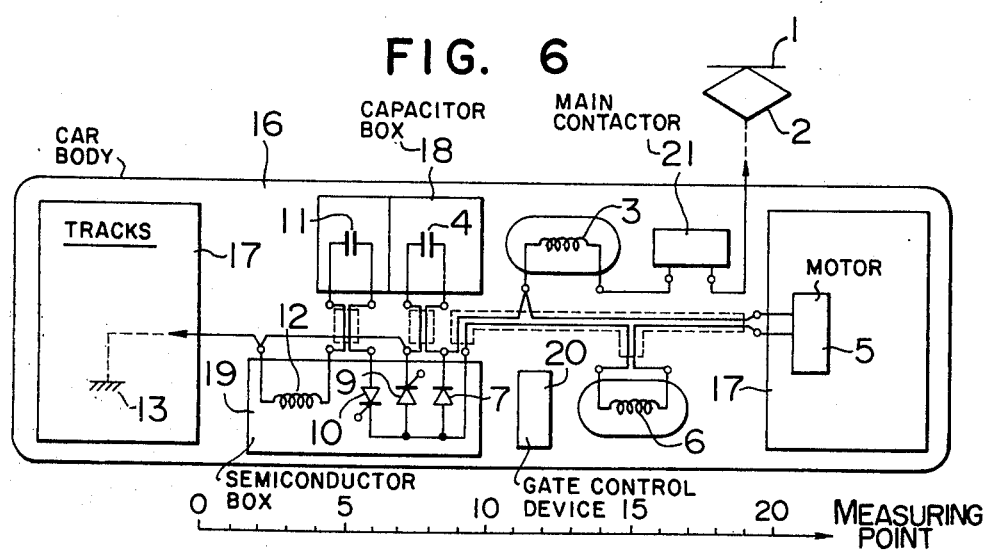
FIG. 6 and FIGS. 7a to 7c show embodiments of the magnetic shield system for electric cars according to the present invention.

The diagram of FIG. 6 shows an example of the manner in which the electrical devices are mounted on the car to which the magnetic shield system of the invention is applied.

This example is different from the conventional method in that the electric wires connecting the electrical devices are placed adjacent to each other. Those electric wires which are located close to each other carry the same magnitude of electric currents flowing the opposite directions. For instance, the two-way wires connecting the commutation capacitor 11 with the auxiliary thyristor 10 and the commutation reactor 12 are placed close to each other.

Figure 7A:
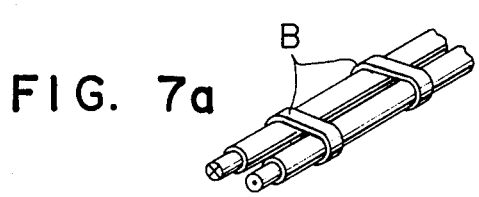
Figure 7B:
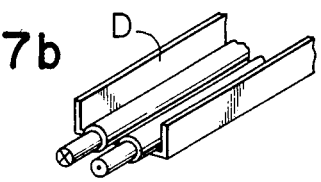
Figure 7C:
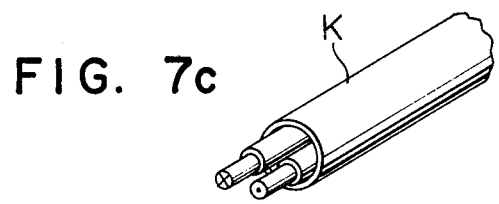

The method of this close arrangement consists in using the bands B as shown in FIG. 7a, using the duct D as shown in FIG. 7b, sealing the wires in the tube K as shown in FIG. 7c or twisting them together or any other suitable one.

Figure 8:
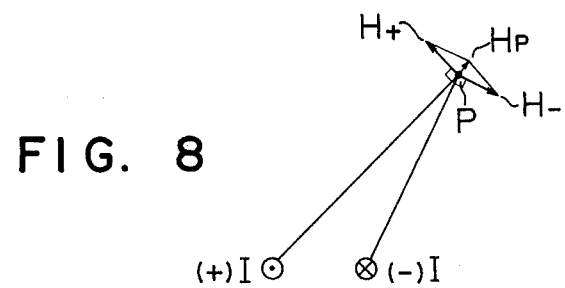
FIG. 8 is a diagram showing the operating principle for explaining the effect of the embodiments.

The advantages obtained by the close arrangement of the two-way wires will be fundamentally explained with reference to FIG. 8. The magnetic field Hp generated at a given point P in the space when the currents +I and −I of the same magnitude flow in opposite directions is a composite one made up of a vectorial sum of the magnetic fields H+ and H− due to the currents. The shorter the distance between the wires, the magnetic fields H+ and H− offset each other more, and hence, the smaller the composite magnetic field Hp. The small composite field Hp means fewer magnetic fluxes produced outside.

By the way, even if the currents in the wires are not identical in magnitude due to the fact that a current from other circuits is superimposed on the current in one of the wires, the magnetic fields produced by the two-way current components nevertheless offset each other.

Figure 9:
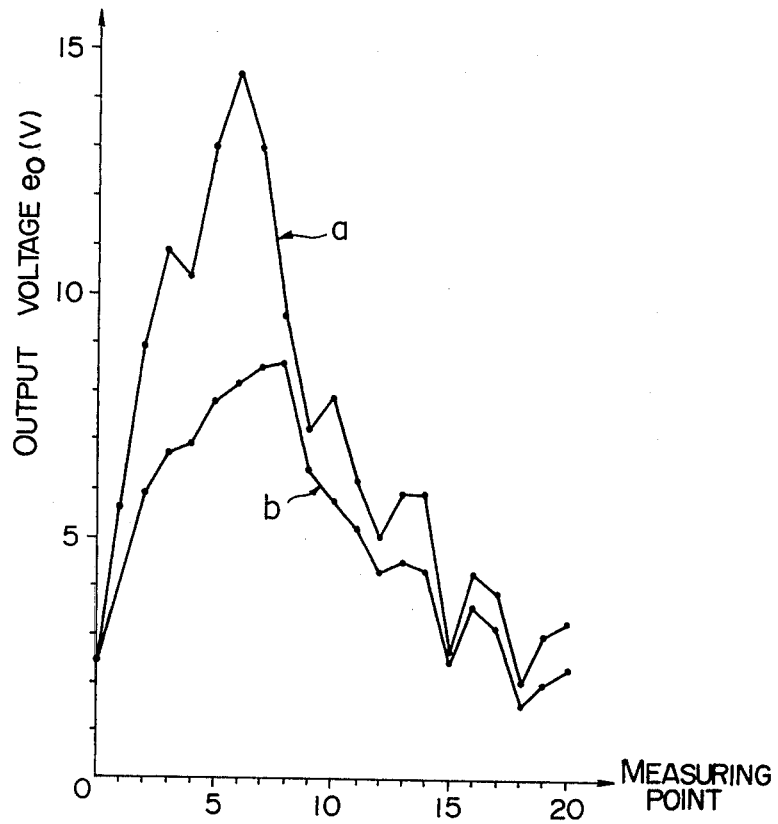
FIG. 9 is a graph showing the result of the measurement of the effect on the receiver in the embodiment of FIG. 6.

The result of measurement of the effect that the arrangement of the devices shown in FIG. 6 has on the receiver 28 is shown in the graph of FIG. 9. In this figure, the polygonal line $b$ represents the result of the test conducted on the arrangement of the devices shown in FIG. 6. When this result is compared with the polygonal line $a$ for the conventional arrangement, it will be seen that the maximum value of the output voltage $e_O$ of the receiver 28 produced by the noise is sharply reduced.

According to this embodiment, the noise can be reduced without addition of any parts, but only by arranging the electric wires between the electric devices in such a manner that those electric wires carrying electric currents substantially the same in magnitude but opposite in direction are disposed close to each other.

Figure 10:
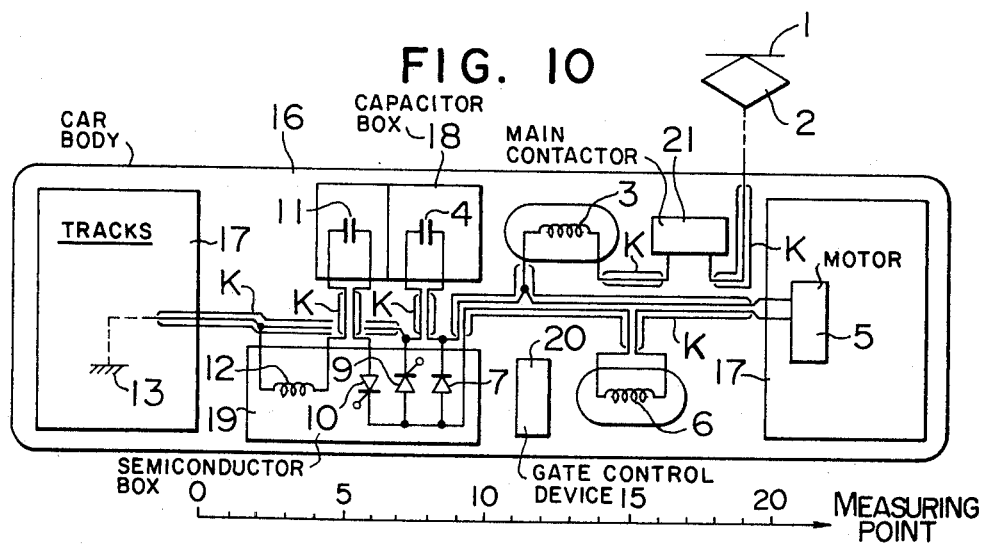

Another example of arrangement of car-mounted electrical devices to which the magnetic shield system according to the present invention is applied is shown in FIG. 10.

This embodiment is different from the conventional arrangement in that in this embodiment the electric wires connecting the electric devices are disposed close to each other and also sealed in the tube K of magnetic material.

The advantage derived from the close arrangement of the electric wires is the same as that obtained in the preceding embodiment. Since the electric wires are contained in the magnetic material higher in magnetic permeability than air, the current flowing in the wires is concentrated inward of the magnetic material, with the result that less magnetic fluxes present themselves outside.

The result of measurement made on this embodiment is illustrated graphically in FIG. 11. Such a result is represented by the polygonal line $c$, which as compared with the polygonal line $a$ illustrating the measurement result for the conventional method of arrangement, involves less noise.

Still another example of the arrangement of electric devices to which the car magnetic shield system according to the invention is applied is shown in FIG. 12.

The difference of this example of arrangement from the conventional arrangement lies in the fact that the electric wires are kept close to each other and that the main smoothing reactor 6 is placed substantially at the center of the car body with the axis 6' of the reactor at right angles to the rails.

The advantage obtained from the close wire arrangement is the same as the one described already. The location of the axis 6' of the main smoothing reactor 6 at right angles to the rails has an advantage in that the noise distribution in the neighbourhood of the main smoothing reactor (in the neighbourhood of the measuring point 15) is smoothed.

In the conventional system where the main smoothing reactor 6 is arranged with its axis parallel to the rails, the noise is distributed in such a manner that it is small at the center of the reactor 6 and larger at the ends thereof, forming a valley-shaped curve, as is apparent from the result of measurement at and around the measuring point 15 shown in FIG. 5.

Figure 13A:
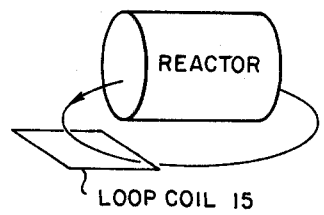
FIGS. 13a and 13b are diagrams for explaining the relation between reactor and a loop coil.
Figure 13B:
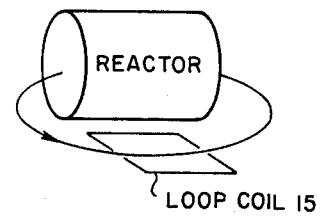

The reason for this is considered to be due to the fact that, in the case where an end of the reactor comes to the center of the loop coil 15 as shown in FIG. 13a, the magnetic fluxes produced by the reactor pass through the loop coil; while when the center of the reactor comes to the center of the loop coil 15 as shown in FIG. 13b, the magnetic fluxes produced from the reactor do not pass through the loop coil.

When the noise distribution lacks uniformity as mentioned above, the variation of noise intensity is likely to approach the code wave frequency used in the signal device of modulation type at a given car speed. In such a case, even the signal device which otherwise might be immune to actuation error may be operated mistakenly, as already explained.

In the embodiment under consideration, the main smoothing reactor 6 is placed at the center of the car body with the reactor axis 6' at right angles to the rails, thereby reducing the magnetic fluxes passing through the loop coil.

Figure 14:
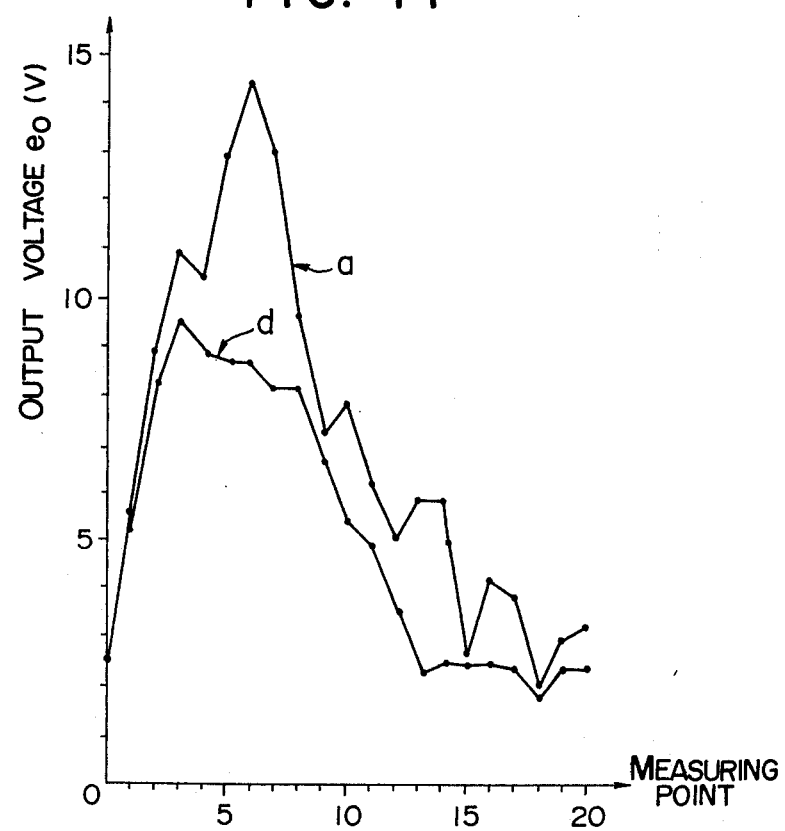

The graph of FIG. 14 shows the result of measurement of noise produced in the embodiment under consideration. The polygonal line $d$ is concerned with the present embodiment which is apparently improved as compared with the polygonal line $a$ representing the result of measurement for the conventional method of arrangement.

Figure 15:
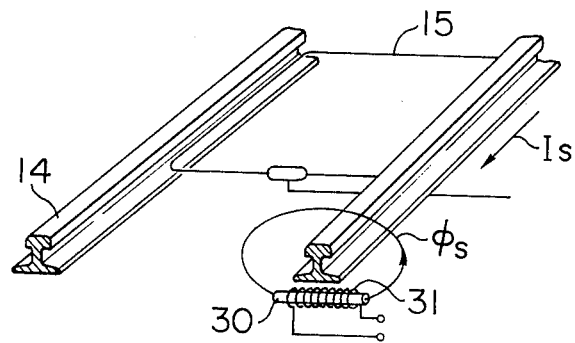
FIG. 15 shows another example of the pickup of the signal device.
Figure 16:
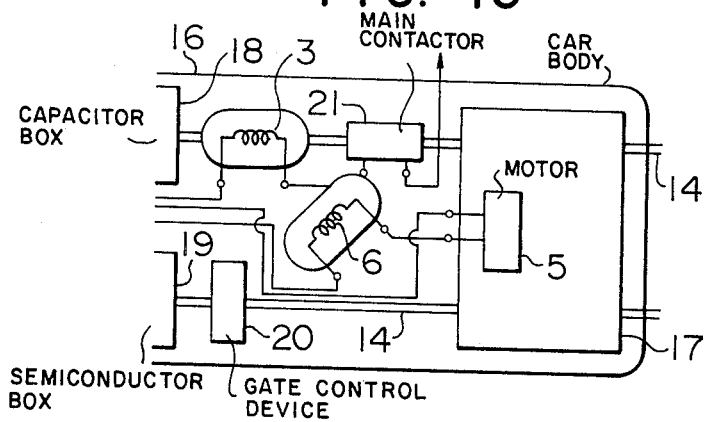
Figure 17:
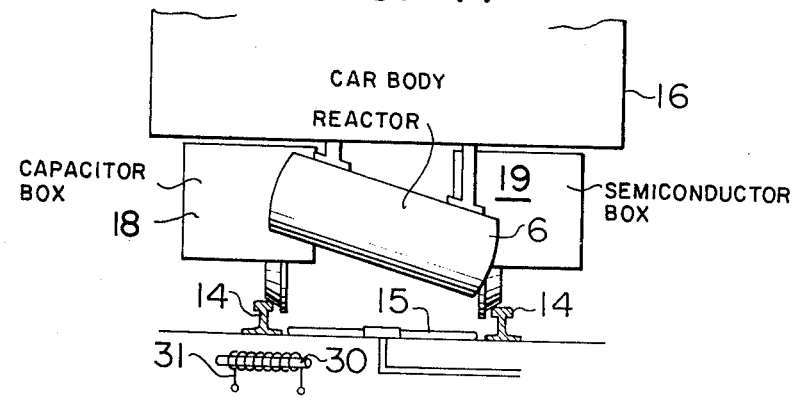

The diagram of FIG. 15 shows a signal device comprising a pick-up which in turn includes a core 30 and a coil 31 at right angles to the rails 14. When this pick-up is used for detecting the signal current Is, the effect of the noise on the loop coil 15 and the coil 31 is reduced by placing the axis of the main smoothing reactor 6 at an angle with the rails 14, as shown in FIG. 16. Alternatively, the end of the main smoothing reactor 6 which is opposed to the core 30 and the coil 31 is rendered higher than the other end thereof as shown in FIG. 17.

Figure 18:
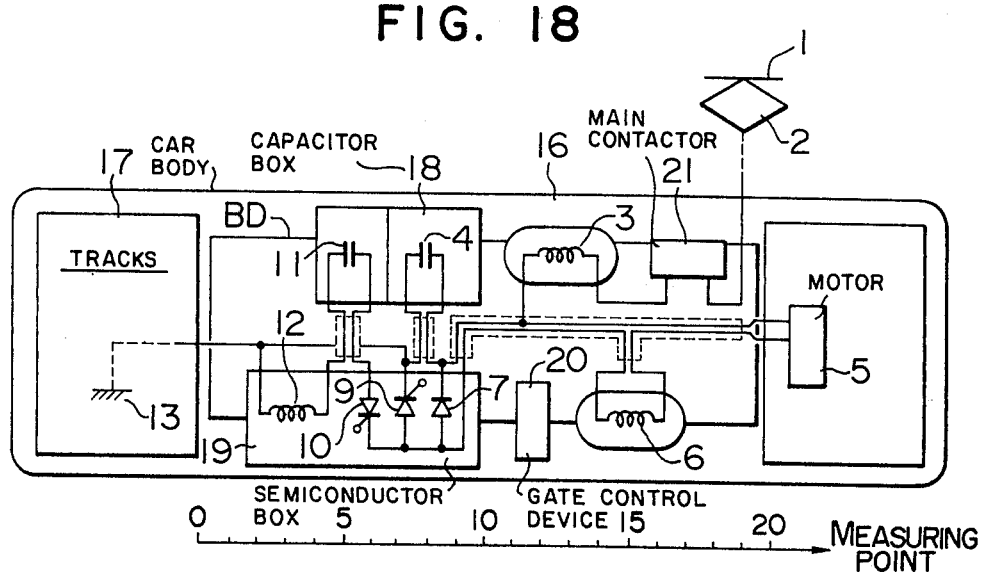

Still another example of the arrangement of electric devices on the car to which the magnetic shield system according to the present invention is applied is shown in FIG. 18.

This embodiment is different from the conventional arrangement in that not only the electric wires are disposed close to each other but a shield plate BD is additionally provided.

Figure 19:
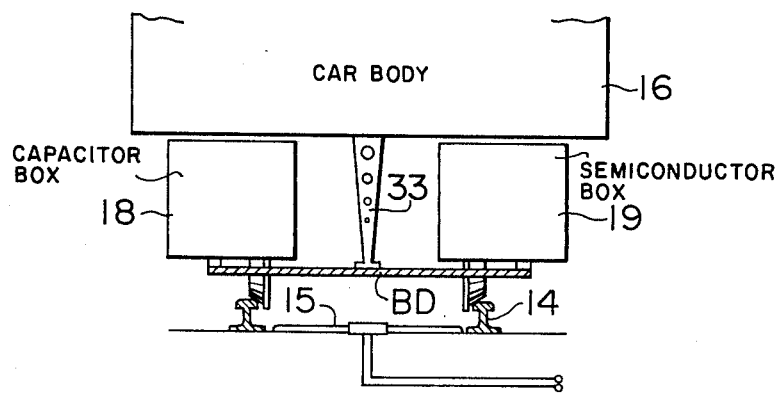

The manner in which the shield plate BD is mounted is shown in FIG. 19 as viewed in the direction of car travel. In this drawing, numeral 33 shows a member for mounting the shield plate BD on the car body 16.

The advantage obtained by mounting the shield plate BD lies in the fact that the magnetic fluxes produced outside of the car are shielded.

Figure 20:
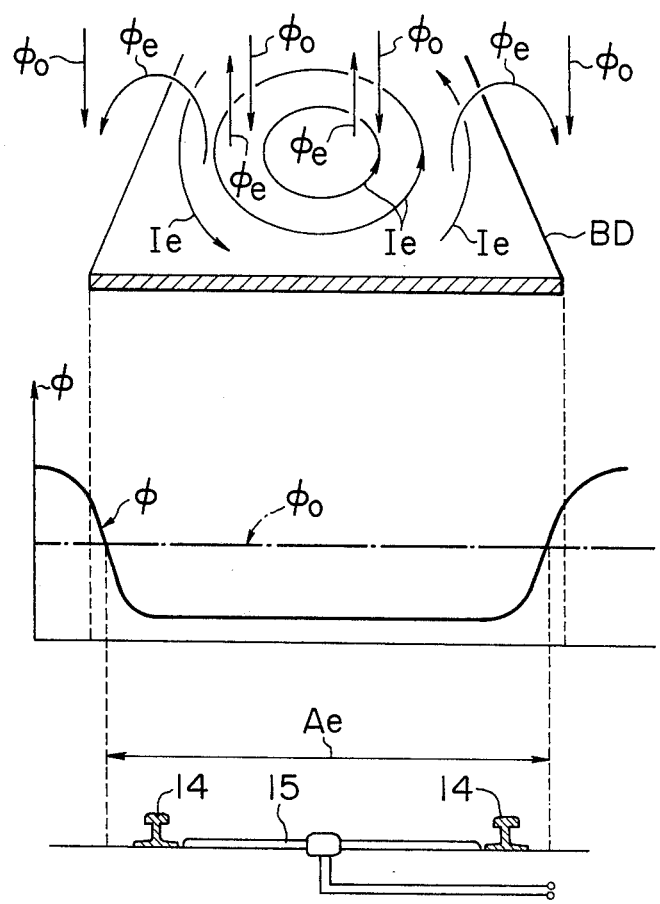
FIG. 20 is a diagram for explaining the magnetic shield effect obtained by a shield plate.

The operating principle of the shielding of the magnetic fluxes by the shield plate BD will be explained below with reference to FIG. 20.

In the figure, symbol $\phi_o$ shows magnetic fluxes produced by the car, symbol Ie an eddy current produced in the shield plate BD by the magnetic fluxes $\phi_o$, symbol $\phi_e$ magnetic fluxes produced by the eddy current Ie, and symbol $\phi$ the distribution of the composite magnetic fluxes including the magnetic fluxes $\phi_o$ and $\phi_e$. When the shield plate BD is placed in the space where the magnetic fluxes are present, the eddy current Ie flows in the shield plate BD thereby to produce the magnetic fluxes $\phi_e$, the shield plate being a conductor allowing the passage of the eddy current. The production of the magnetic fluxes $\phi_e$ is in such a direction as to offset the magnetic fluxes $\phi_o$ produced from the car, in the surface of the shield plate BD. As a result, the composite magnetic fluxes $\phi$ are fewer than the magnetic fluxes $\phi_o$. At a point in the space distance from the edge of the shield plate BD, on the other hand, the magnetic fluxes $\phi_e$ curling around the shield plate BD toward the back thereof flow in the same direction as the magnetic fluxes $\phi_o$ so that the composite magnetic fluxes $\phi$ are more than the magnetic fluxes $\phi_o$. Such a condition is illustrated by the curve $\phi$ in the graph shown in FIG. 20. From this graph, it is noted that the magnetic fluxes $\phi_o$ produced from the car are reduced by the shield plate BD in the range Ae. For this reason, it is necessary to provide a shield plate BD with a sufficiently large effective range Ae to cover the loop coil 15. The embodiment under consideration of course employs the shield plate BD of such a size that the effective range Ae covers the loop coil 15.

Figure 21:
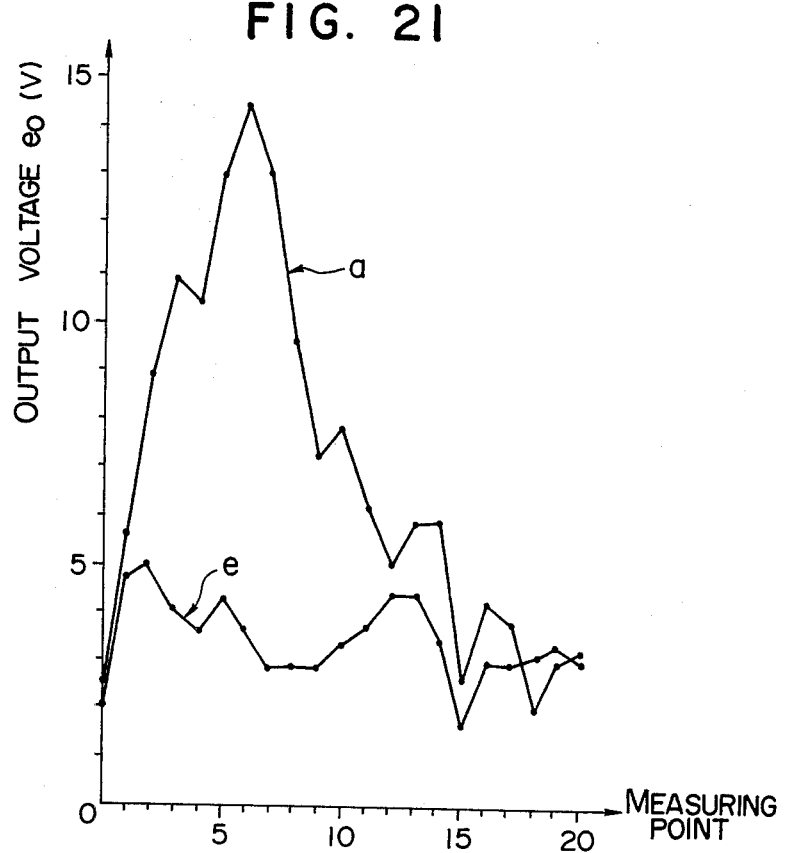

A graph showing the result of measurement of noise in the embodiment under consideration is illustrated in FIG. 21. The polygonal line $e$ is concerned with the present embodiment and improved as compared with the polygonal line $a$ representing the result of measurement based on the conventional arrangement.

Figure 22:
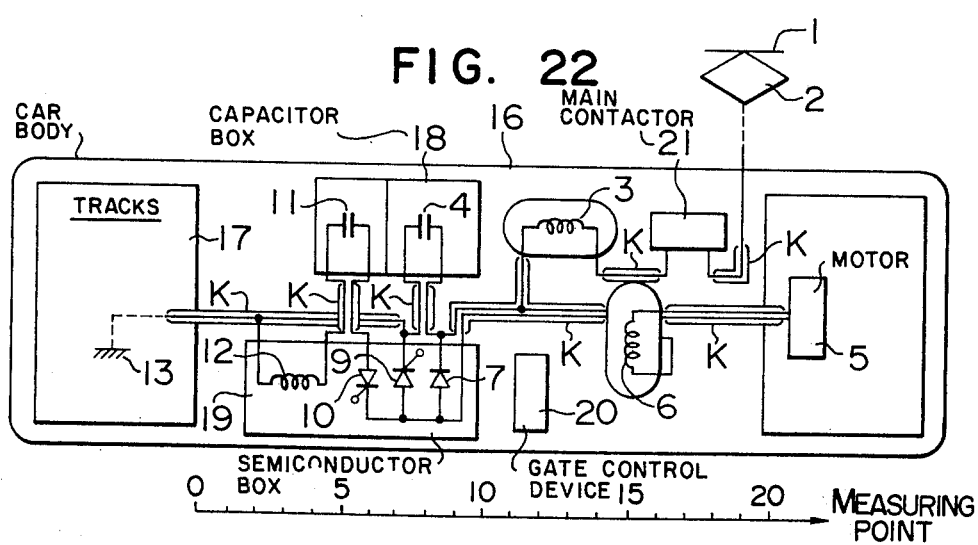

A further example of the arrangement of electric devices on the car to which the magnetic shield system according to the present invention is applied is shown in the diagram of FIG. 22.

Unlike the conventional arrangement, this embodiment has a feature in that, in addition to the close arrangement of the electric wires, the electric wires are sealed in the magnetic material K and that the main smoothing reactor 6 with its axis 6' at right angles to the rails is located at the center of the car body 16.

The advantages attributable to the close arrangement of the electric wires, to the sealing of the electric wires with the magnetic material K, and to the fact that the main smoothing reactor 6 with its axis 6' at right angles to the rails is located at the center of the car body 16, will not be repeated as they are already mentioned above with reference to the preceding embodiments.

Figure 23:
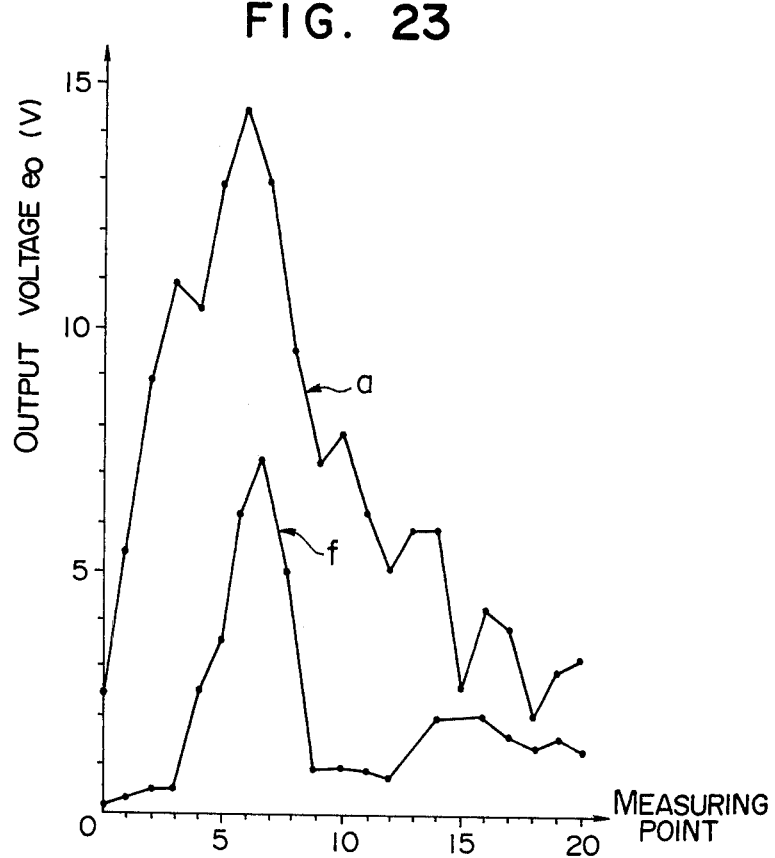

The graph of FIG. 23 shows the result of noise measurement for the present embodiment. The polygonal line $f$ shows the case of the embodiment under consideration and is improved as compared with the polygonal line $a$ representing the result of measurement involving the conventional arrangement of electrical devices.

Figure 24:
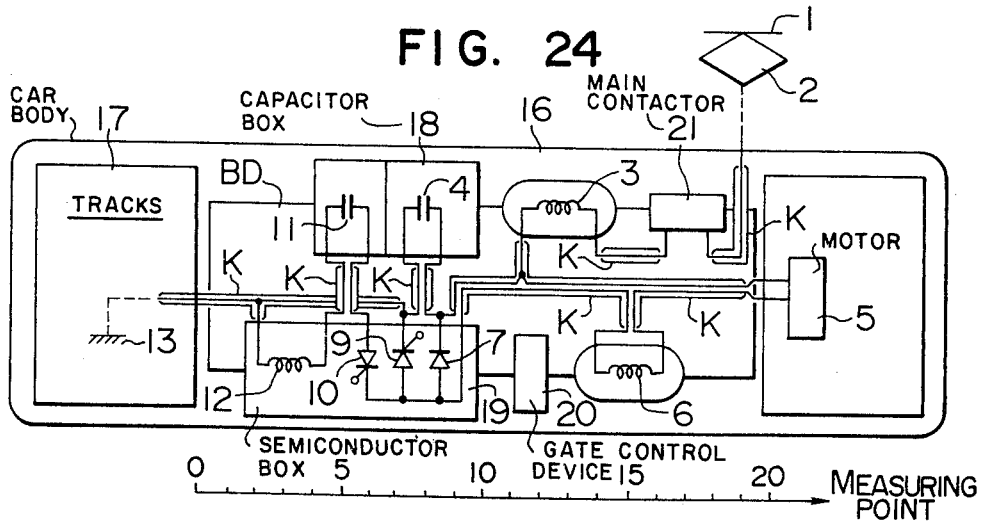

A still further example of the arrangement of electric devices on the car to which the magnetic shield system according to the present invention is applied is shown in FIG. 24.

The difference of this embodiment from the conventional manner of arrangement lies in the fact that the electrical wires are located close to each other, that the electrical wires are sealed in the magnetic material K, and that the shield plate BD is added.

The advantages obtained by the close arrangement of electrical wires, by the sealing of the electrical wires in the magnetic material, and by the mounting of the shield plate BD will not be explained here as they are already explained above with reference to the preceding embodiments.

Figure 25:
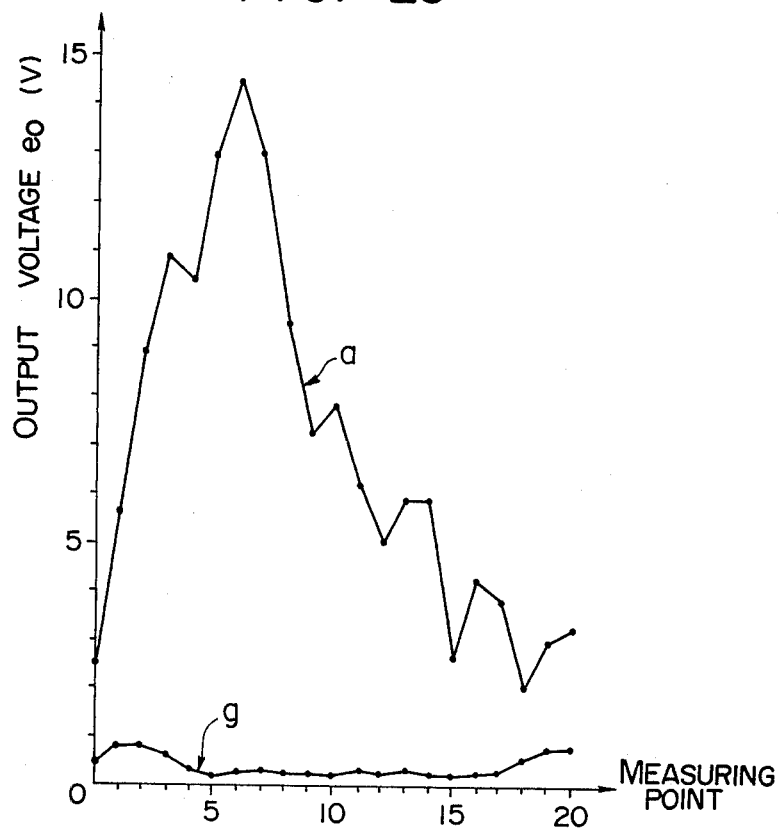

The diagram of FIG. 25 shows a graph representing the result of noise measurement according to the present embodiment. The polygonal unit $g$ is the result for the present embodiment and improved greatly as compared with the conventional method of arrangement.

Figure 26:
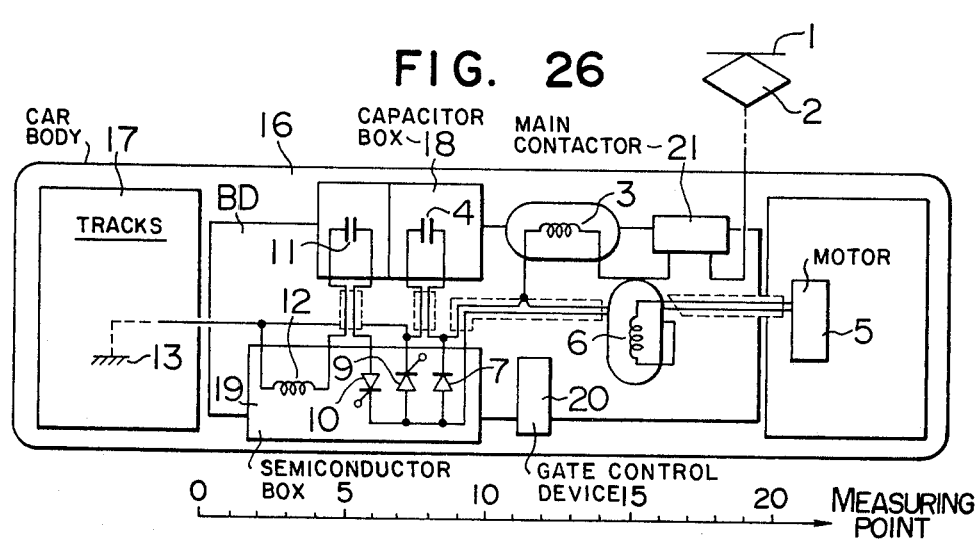

Another example of the arrangement of car-mounted electrical devices to which the magnetic shield system according to the present invention is applied is shown in FIG. 26.

Figure 27:
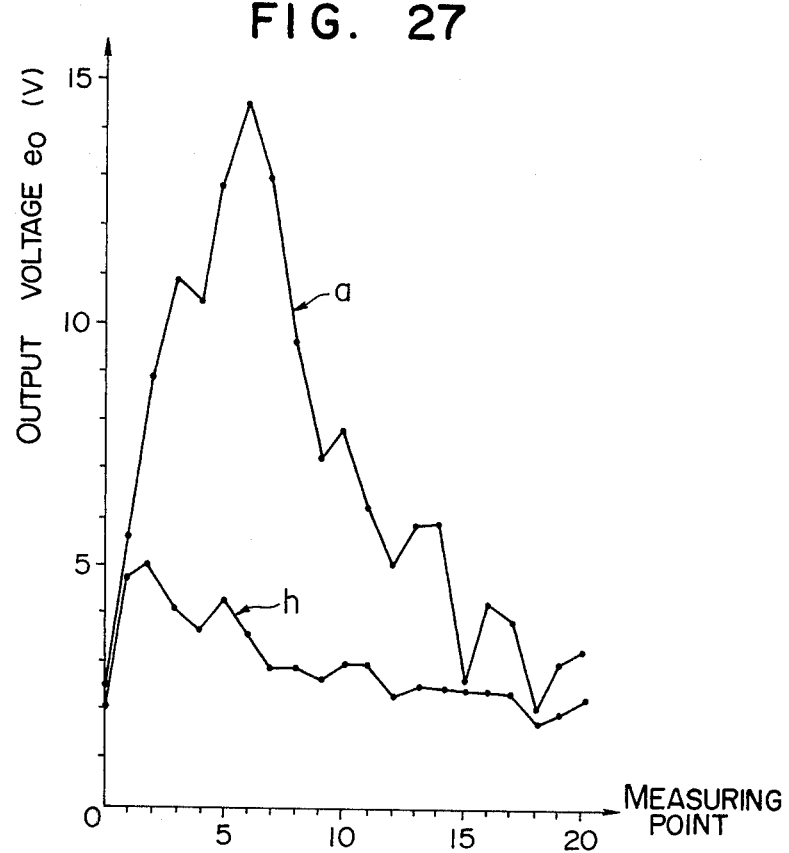

This embodiment differs from the conventional method in that the electrical wires are laid close to each other, that the main smoothing reactor 6 with the axis thereof is located at the center of the car body 16, and that the shield plate BD is mounted. The result of measurement of the noise caused in the present embodiment is shown in the graph of FIG. 27. It is seen that the polygonal line $h$ for the embodiment shows an improvement as compared with the conventional arrangement.

Figure 28:
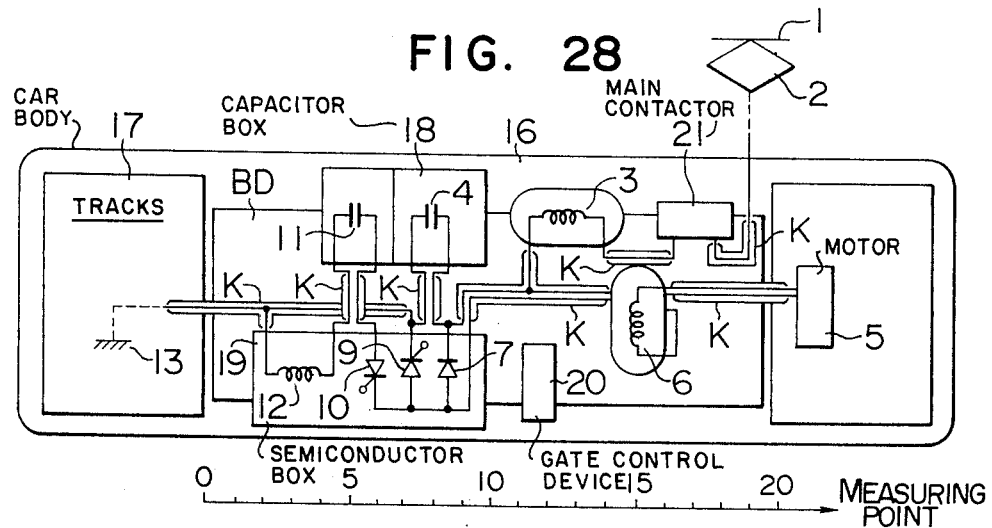
Figure 29:
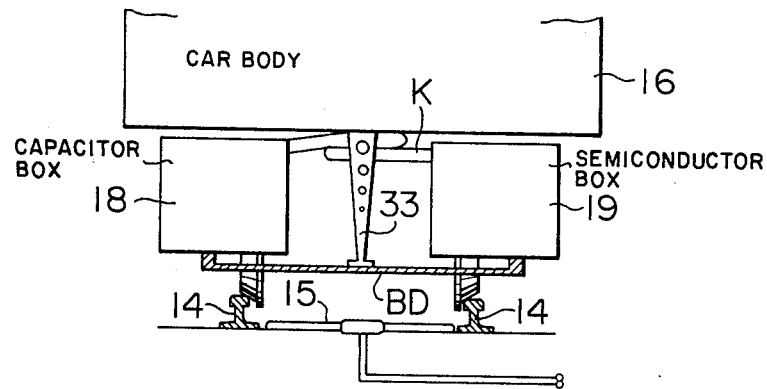

FIG. 28 shows a diagram of another example of the arrangement of car-mounted electrical devices to which the car magnetic shield system according to the present invention is applied. A diagram of this embodiment as viewed in the direction of car travel is illustrated in FIG. 29.

This embodiment is different from the conventional arrangement in that the electrical wires are mounted in proximity to each other, that the electrical wires are sealed in the magnetic material K, that the main smoothing reactor 6 with the axis thereof at right angles to the rails is located at the center of the car body 16, and that the shield plate BD is additionally mounted.

Figure 30:
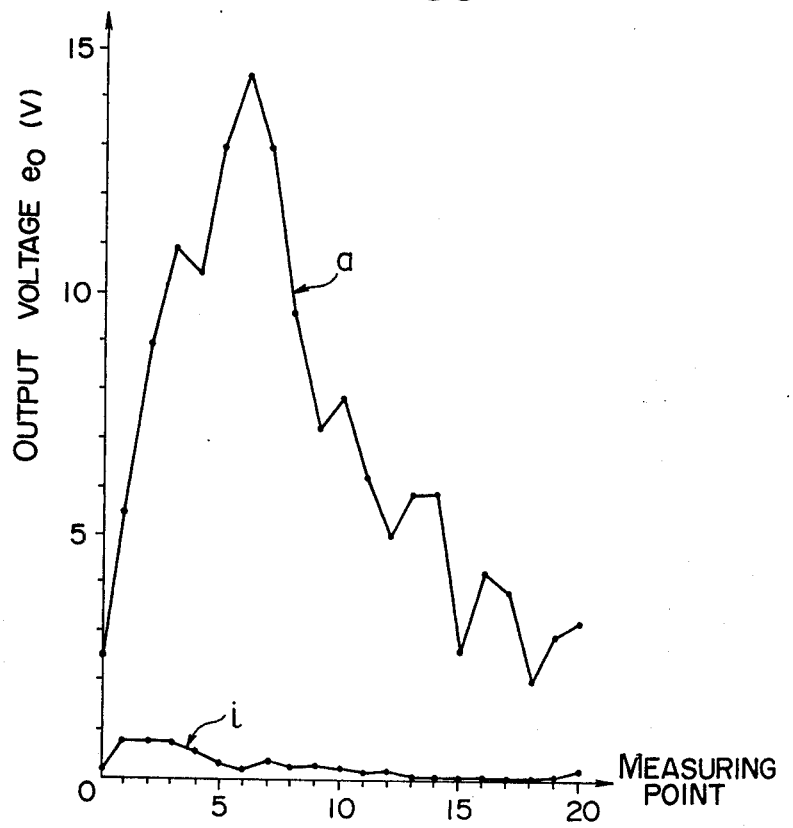

The graph of FIG. 30 shows the result of noise measurement in the embodiment under consideration. The polygonal line $i$ concerns the present embodiment and is improved greatly as compared with the conventional arrangement.

The shield plate BD in the above-mentioned embodiments comprises a sheet of conductor plate. What is important in the present invention, however, is to reduce the magnetic fluxes produced toward the track from the car. The shield plate BD is therefore not necessarily limited to a single sheet. Instead, a plurality of small conductor sheets with their ends overlapped one on another may be made into a size large enough for a magnetic shield. As another alternative, a coil LS making up a closed loop as shown in FIG. 31 may be used in place of the shield plate.

Further, even though only the main smoothing reactor 6 is arranged with the axis thereof perpendicular to the rails and at the center of the car body 16 in the above embodiments such an arrangement is not limited to the main smoothing reactor 6 but may be equally applied also 40 the filter reactor 3 and the commutation reactor 12.

It will be understood from the foregoing description that according to the present invention a magnetic shield system for electric cars is provided so that the magnetic fluxes produced from the car to the track are reduced.

We claim:

1. A magnetic shield system for an electric car comprising:
   a car body;
   a plurality of electrical devices arranged on the underside of the floor of said car body;
   means including electric wires for electrically connecting said electrical devices according to their functions;
   those of said electric wires through which currents of substantially the same magnitude flow in opposite directions being closely located to each other; and
   tube means made of magnetic material for magneticaly shielding said those electric wires.

2. A magnetic shield system, according to claim 1, wherein said plurality of electrical devices include a reactor arranged in parallel to a plane which includes the rails on which the car runs and at right angles to the rails, beneath said car body.

3. A magnetic shield system according to claim 1, in which a shield plate covering said plurality of electrical devices is mounted on the underside of the floor of said car body.

4. A magnetic shield system according to claim 2, in which a shield plate covering said plurality of electrical devices is provided on the underside of the floor of said car body.

5. In a electric car having a car body with a plurality of electrical control elements arranged beneath the floor of the car body and pairs of electric wires interconnecting associated ones of said control elements in accordance with the control functions performed thereby, the improvement comprising a magnetic shielding system for preventing signal devices located along tracks upon which said electric car travels from being erroneously operated by magnetic fluxes produced by current flowing in said electric wires, wherein those electric wires of each respective pair through which currents of substantially the same magnitude flow in opposite directions are disposed adjacent to each other and are enveloped by tubes of magnetic material for magnetically shielding those electric wires.

6. The improvement according to claim 5, wherein said plurality of electrical control elements include a reactor arranged in parallel to a plane including said tracks and at right angles to said tracks, beneath said car body.

7. The improvement according to claim 6, wherein a shield plate covering such plurality of electrical control elements is mounted upon the underside of the floor of said car body.

* * * * *